United States Patent
Koeda et al.

(10) Patent No.: US 10,788,592 B2
(45) Date of Patent: Sep. 29, 2020

(54) RADIOGRAPHIC IMAGING APPARATUS AND RADIOGRAPHIC IMAGING SYSTEM

(71) Applicant: KONICA MINOLTA, INC., Chiyoda-ku, Tokyo (JP)

(72) Inventors: Keisuke Koeda, Higashimurayama (JP); Kazuhiro Sakino, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 163 days.

(21) Appl. No.: 15/961,208

(22) Filed: Apr. 24, 2018

(65) Prior Publication Data

US 2018/0335528 A1  Nov. 22, 2018

(30) Foreign Application Priority Data

May 22, 2017 (JP) ................. 2017-100514

(51) Int. Cl.
```
G01T 1/208    (2006.01)
G01T 1/20     (2006.01)
H04N 5/32     (2006.01)
G01T 1/24     (2006.01)
H04N 5/361    (2011.01)
```
(52) U.S. Cl.
CPC ............ G01T 1/208 (2013.01); G01T 1/2018 (2013.01); G01T 1/247 (2013.01); H04N 5/32 (2013.01); H04N 5/361 (2013.01)

(58) Field of Classification Search
CPC ....... G01T 1/208; G01T 1/2018; G01T 1/247; H04N 5/32; H04N 5/361
See application file for complete search history.

(56) References Cited

U.S. PATENT DOCUMENTS

| | | | | |
|---|---|---|---|---|
| 2008/0237508 A1* | 10/2008 | Iwakiri | ................. | G01T 7/005 250/591 |
| 2011/0108710 A1* | 5/2011 | Yonekawa | ............. | A61B 6/585 250/214 C |
| 2013/0032696 A1* | 2/2013 | Tajima | ..................... | A61B 6/42 250/208.1 |
| 2013/0193339 A1* | 8/2013 | Oda | .......................... | G01T 1/17 250/394 |

(Continued)

FOREIGN PATENT DOCUMENTS

JP  2010112781 A  5/2010

*Primary Examiner* — David P Porta
*Assistant Examiner* — Jeremy S Valentiner
(74) *Attorney, Agent, or Firm* — Holtz, Holtz & Volek PC

(57) ABSTRACT

A radiographic imaging apparatus includes a base, a signal line, a reader and a hardware processor. On the base board, pixels comprising respective radiation detecting elements and respective switching elements are arranged in a matrix. The signal line is connected through the switching elements. The reader reads the charges accumulated in the pixels at every predetermined lines as signal values of image data. The hardware processor measures a leak current flowing through the signal line and corrects the signal values based on leak current values including a leak current value obtained at a timing when (i) the number of lines which have been already read is greater than a predetermined number of lines and (ii) the number of lines which has not been read yet is greater than a predetermined remaining number of lines.

6 Claims, 6 Drawing Sheets

(56) References Cited

U.S. PATENT DOCUMENTS

2013/0235236 A1* 9/2013 Kobayashi ............ H04N 5/361
348/243
2013/0341525 A1* 12/2013 Maruta .................... G01T 1/17
250/394

* cited by examiner

RADIOGRAPHIC IMAGING APPARATUS AND RADIOGRAPHIC IMAGING SYSTEM

BACKGROUND OF THE INVENTION

1. Field of the Invention

The present invention relates to a radiographic imaging apparatus and a radiographic imaging system including the radiographic imaging apparatus.

2. Description of Related Art

Radiographic imaging apparatuses that have been developed in recent years have an AED (Auto Exposure Detect) function of automatically detecting a radiation to start a photographing process. Radiographic imaging with the AED function typically involves repeating on/off switching of TFTs disposed in a line (gate line) of pixels connected to a single scanning line (dark charge resetting) while sequentially changing the operating gate line until a radiation is detected. This results in decreased signal values due to the dark charge resetting in pixels in a gate line that is scanned after emission of the radiation before detection of the radiation (hereinafter a gate line with decreased signal values is referred to as a low signal line). To cope with this, the AED function is combined with a technique to correct signal values of a low signal line.

It may be possible to reduce the gate scanning time in order to reduce the waiting time of a user. However, this increases the number of low signal lines since the time from the start of a radiation to detection of the radiation remains the same, which results in the degraded correction performance and image quality. To solve the problem, a technique to reduce such degradation of image quality was developed which involves discretely scanning gate lines at every predetermined lines (discrete scanning) instead of sequentially scanning gate lines (sequential scanning) (see JP 5459066B). Specifically, in discrete scanning, lines adjacent to a low signal line do not suffer from low signals. By using these signal values, it is possible to improve the correction performance and thus to correct the low signal line with high precision.

On the other hand, the progress of techniques in reducing electric noises produces another problem that degrades the image quality in which horizontal stripes (periodic uneven density) corresponding to the intervals of discrete scanning appear in an image. It is assumed this is due to a leak current as described in JP 2010-112781A. This leak current reduces as signal charges are read from pixels. When discrete scanning is performed at every N lines, the leak current to be added to signals is lower in gate lines in the second cycle of N cycles than in gate lines in the first cycle of N cycles. This causes periodic horizontal lines corresponding to the discrete scanning.

One of techniques to diminish the influence of such leak current is described in JP 2010-112781A, which involves determining the amount of leak current (early leak amount) before signal values are read and correcting the signal values based on the detected amount of leak current.

The technique disclosed in JP 2010-112781A is to make the correction by determining the current (static leak current) that flows from a photo diode (PD) to a signal line through a TFT due to a potential difference between the photo diode and the signal line (source-drain potential difference of the TFT) that is caused when the photo diode is charged.

However, a problem with this technique is insufficient precision in determining the amount of leak per pixel simply based on the number of pixels that receive a radiation.

Further, our study revealed that a characteristic current that is not mentioned in JP 2010-112781A also flows into a signal line. This current, which is referred to as a PD lag component or a PD forward current component, cannot be corrected even by the technique of JP 2010-112781A.

SUMMARY

The present invention has been made in view of the above-problem, and an object thereof is to correct periodic uneven density due to leak current of pixels and the like with high precision in a radiographic imaging apparatus that discretely scan gate lines.

To achieve at least one of the abovementioned objects, according to an aspect of the present invention, a radiographic imaging apparatus includes:

a base board on which pixels comprising respective radiation detecting elements and respective switching elements are arranged in a matrix, in which the radiation detecting elements accumulate charges when receiving a radiation;

a scanning line for driving the switching elements by on-off control;

a signal line connected through the switching elements, a reader which reads the charges accumulated in the pixels at every predetermined lines as signal values of image data; and a hardware processor which measures a leak current flowing through the signal line and corrects the signal values based on at least three leak current values including a leak current value obtained at a timing when (i) the number of lines which have been already read is equal to or greater than a predetermined number of lines and (ii) the number of lines which has not been read yet is equal to or greater than a predetermined remaining number of lines.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, and wherein.

DETAILED DESCRIPTION OF THE INVENTION

Hereinafter, one or more embodiments of the present invention will be described with reference to the drawings. However, the scope of the invention is not limited to the disclosed embodiments.

Configuration of Radiographic Imaging Apparatus

Figure 1:
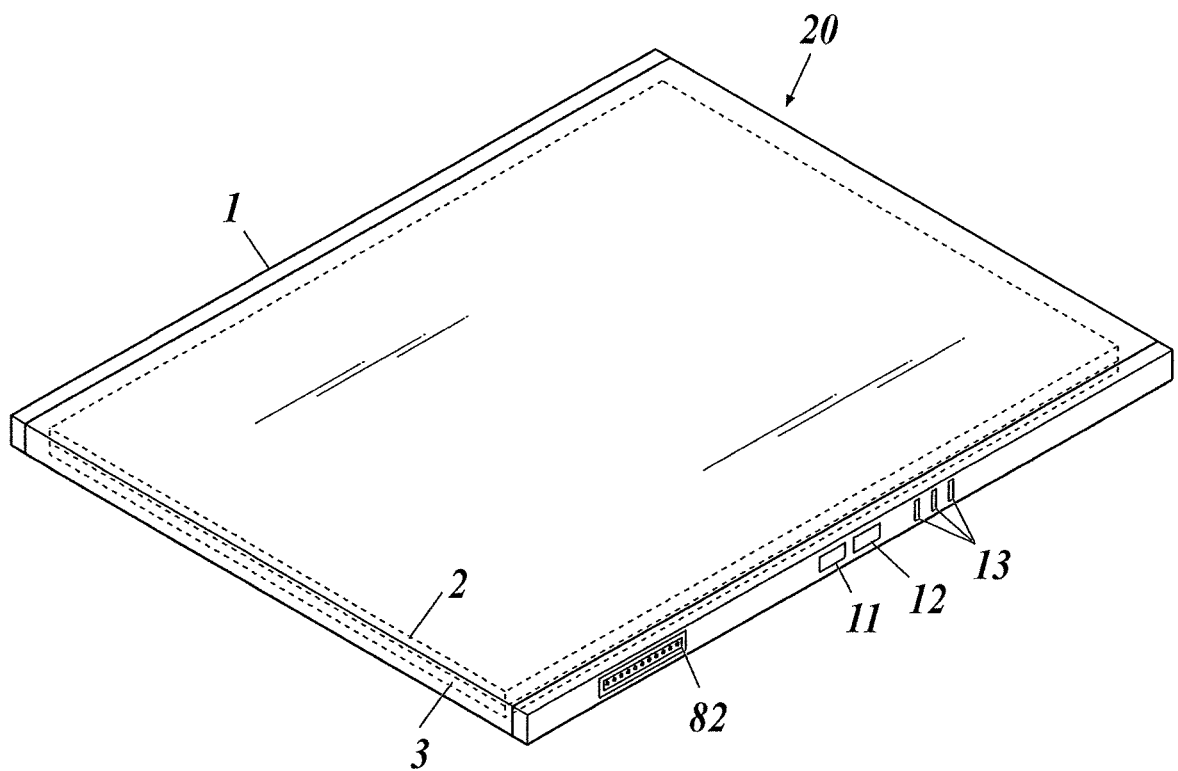
FIG. 1 is a perspective view of an outer appearance of a radiographic imaging apparatus according to an embodiment of the present invention.

First, the specific configuration of a radiographic imaging apparatus 20 according to an embodiment of the present invention will be described. FIG. 1 is a perspective view of a radiographic imaging apparatus 20, FIG. 2 is a front view of a radiation detector 3 of the radiographic imaging apparatus 20, FIG. 3 is a block diagram of the schematic circuit configuration of the radiographic imaging apparatus 20, and FIG. 4 is a timing chart illustrating a part of operation of the radiographic imaging apparatus 20.

The following embodiment is an example of a so-called indirect radiographic imaging apparatus that obtains electric signals by converting a radiation to an electromagnetic wave having a different wavelength such as a visible light. However, the present invention is also applicable to so-called direct radiographic imaging apparatuses that directly convert a radiation to electric signals by using a detecting element.

Figure 2:
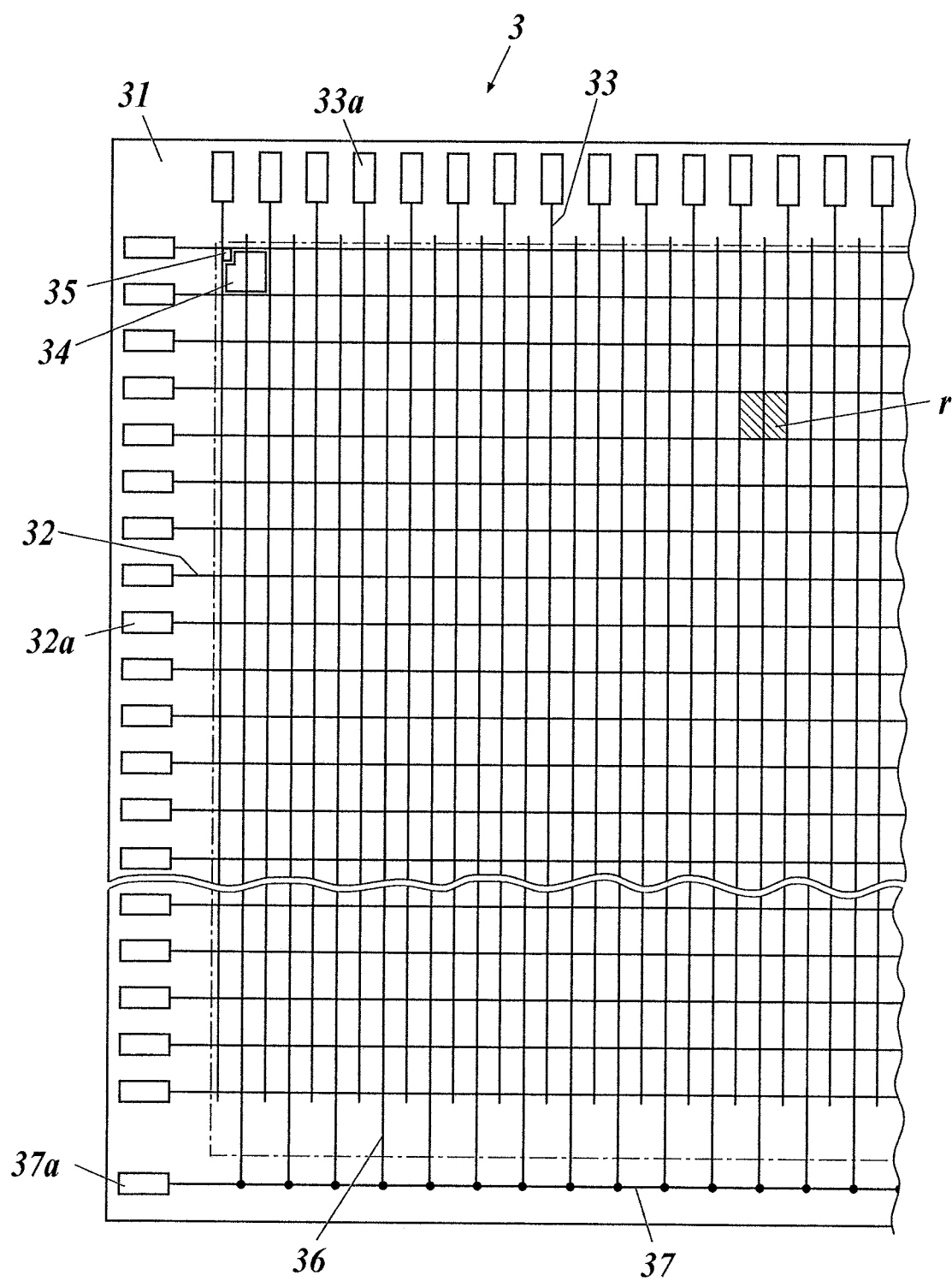
FIG. 2 is a plan view of a radiation detector installed in the radiographic imaging apparatus in FIG. 1.
Figure 3:
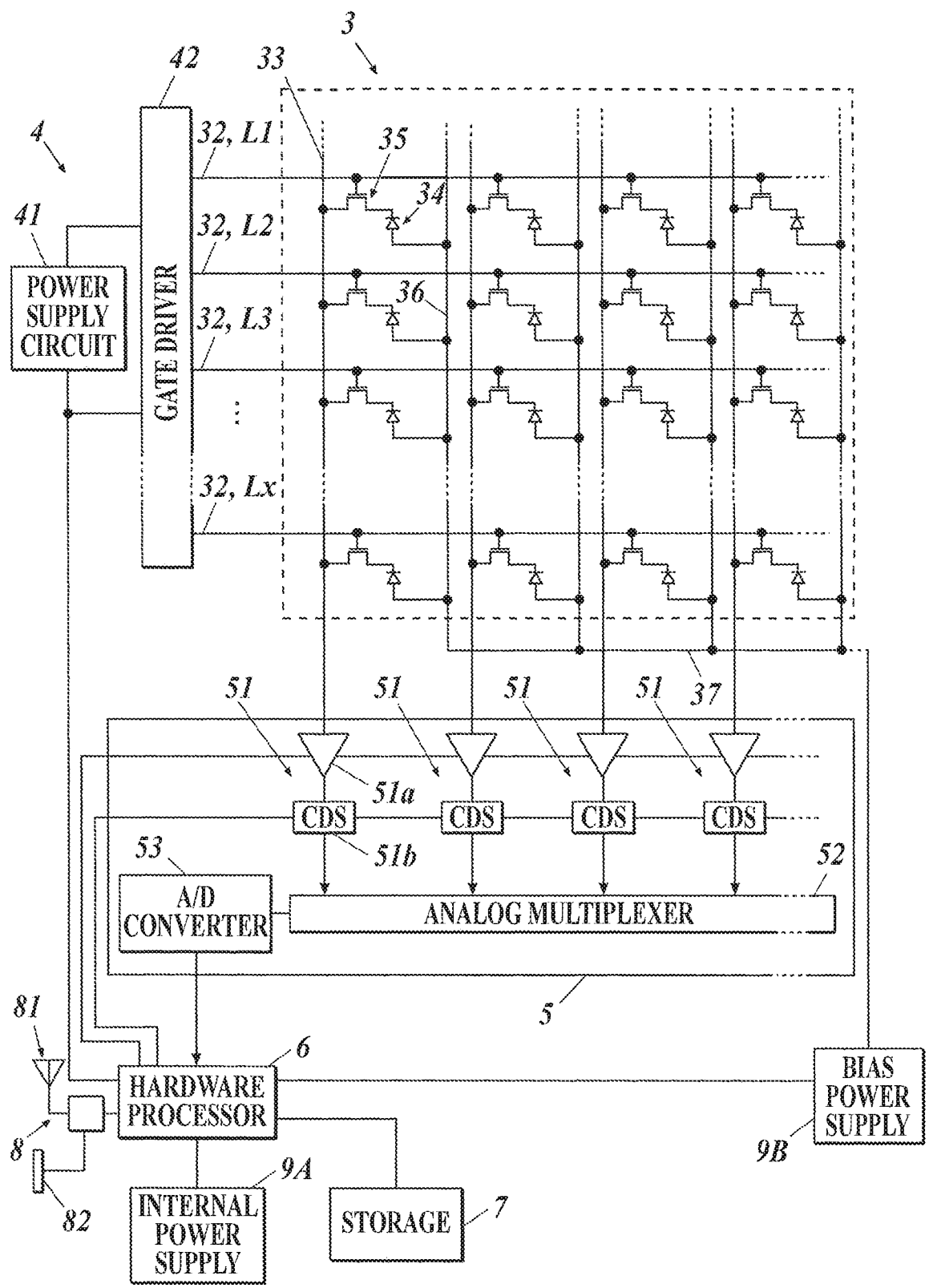
FIG. 3 is a block diagram of an equivalent circuit of the radiographic imaging apparatus in FIG. 1.
Figure 4:
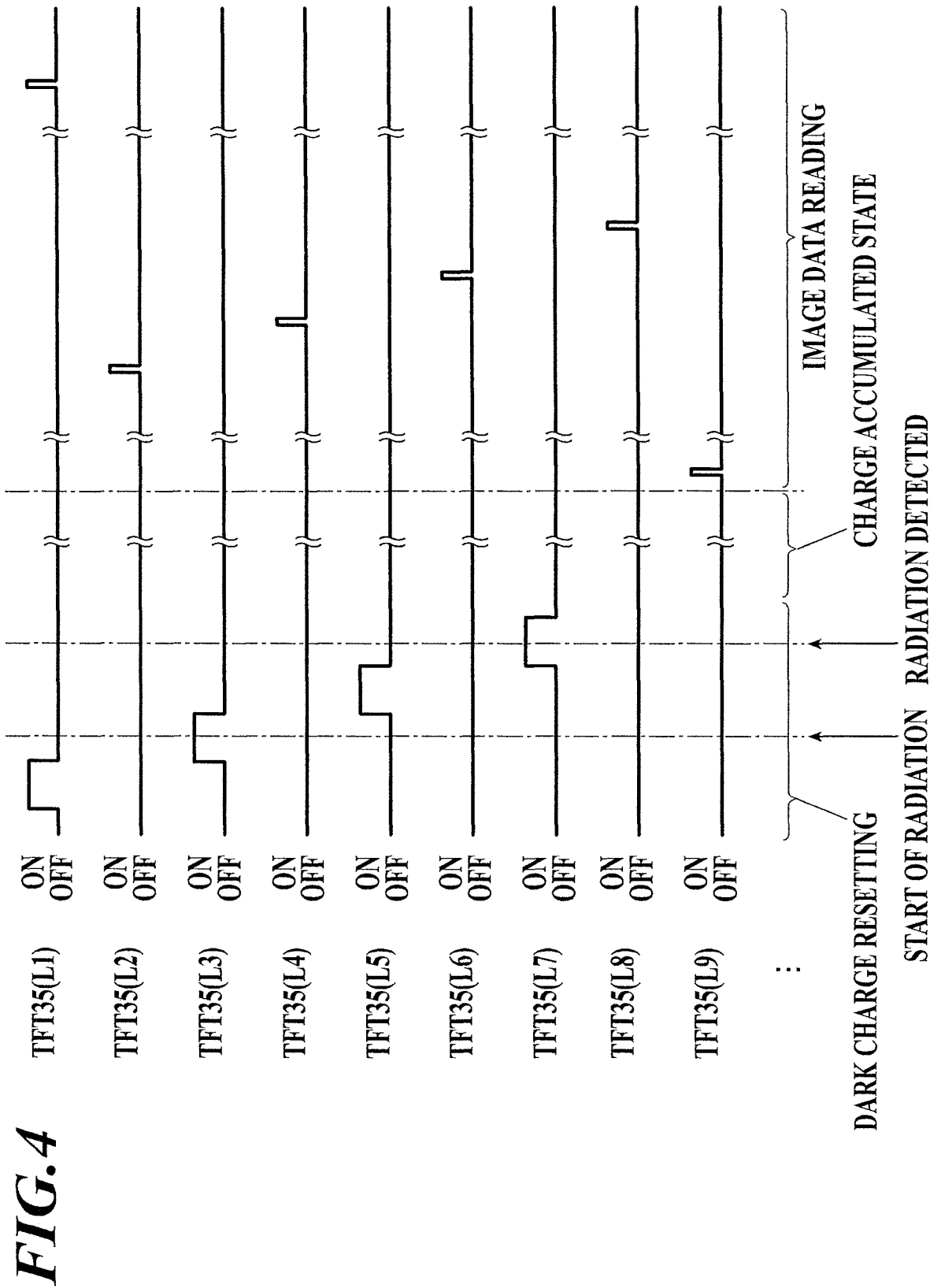
FIG. 4 is a timing chart illustrating the operation of the radiographic imaging apparatus in FIG. 1.

As illustrated in FIG. 1 to FIG. 3, the radiographic imaging apparatus 20 according to the embodiment includes a case 1 and a scintillator 2, a radiation detector 3, a scanning driver 4, a reader 5, a hardware processor 6, a storage 7, a communicator 8, an internal power supply 9A and the like that are housed in the case 1.

At a side face of the case 1, a power switch 11, a selector switch 12, an indicator 13, a connector 82 and the like are disposed as illustrated in FIG. 1.

When the scintillator 2 receives radiation, it emits electromagnetic wave having a longer wavelength such as visible light.

The scintillator 2 may include a reflecting surface in an area corresponding to the radiation detector 3 so that the radiation detector 3 can receive more electromagnetic wave.

In order to reduce diffusion of electromagnetic wave, columnar crystal of CsI may be used.

As illustrated in FIG. 2, the radiation detector 3 includes a base board 31, scanning lines 32, signal lines 33, radiation detecting elements 34, TFTs 35 (switching elements), bias lines 36, a connecting line 37 and the like.

The base board 31 is constituted by a plate made of glass, base film, semiconductor such as silicon and the like, which is disposed in parallel to the scintillator 2.

On the base board 31, the radiation detecting elements 34 are two-dimensionally arranged.

One terminals of the radiation detecting elements 34 are connected to drain terminals of the TFTs 35 as switching elements, and the other terminals are connected to the bias lines.

The scanning lines 32 are connected to gate terminals of the TFTs 35.

The signal lines 33 are disposed perpendicular to the scanning lines 32 and connected to source terminals of the TFTs 35.

The ends of the scanning lines 32 and the signal lines 33 are formed respectively as terminals 32a, 33a so that lead wires can be drawn from a base board 31.

The bias lines 36 are connected to the connecting line 37, and an end of the connecting line 37 is similarly formed as a terminal 37a.

While the bias lines 36 of the embodiment are connected to the connecting line 37, respective terminals 37a may be formed at the bias lines instead. Alternatively, each predetermined number of bias lines 36 may be connected to a connecting line 37 to form two or more terminals 37a. Connecting the bias lines 36 with a single connecting line 37 causes concentration of currents flowing through the bias lines, which results in a larger decrease of voltage due to wiring resistance. However, dividing into two or more connecting lines 37 advantageously reduces such decrease of voltage.

The bias lines 36 may be disposed in a sheet shape over the entire surface in order to reduce the wiring resistance or may be disposed in a grid shape in which vertical lines are connected to horizontal lines at the crossings.

The radiation detecting elements 34, which are constituted by, for example, photodiodes, phototransistors or the like, generate electric signals (currents, charges) according to the dose of the radiation (or the amount of electromagnetic light converted by the scintillator 2) received. The radiation detecting elements 34 may have a different configuration, i.e. be of a CCD type instead.

The radiation detecting elements 34 are disposed respectively in areas r defined by the scanning lines 32 and the signal lines 33. That is, the radiation detecting elements 34 of the embodiment are arranged two-dimensionally (in a matrix). The areas r, which correspond to pixels, are constituted by the respective radiation detecting elements 34 and the respective TFTs 35. The radiation detecting elements 34 of the radiation detector 3 housed in the case 1 are opposed to the scintillator 2.

As with the radiation detecting elements 34, the TFTs 35 are respectively disposed in the areas r. Each of the TFTs 35 is configured such that gate, source and drain terminals are connected respectively to an adjacent scanning line 32, an adjacent signal line 33 and a radiation detecting element 34 in the same area r. Accordingly, the radiation detecting elements 34 are indirectly connected to the scanning lines 32 and the signal lines 33.

The TFTs 35 may not be disposed in some of the areas r. In such areas r, the radiation detecting elements 34 are connected to the signal lines 33 by lead wires.

Further, the sources and the drains of the TFTs 35 may be interchanged with each other since they have the same function.

The bias lines 36 are disposed between the signal lines 33 and parallel to the signal lines 33 so as not to electrically connect with the intersecting scanning lines 32.

The connecting line 37 is disposed at the edge of the base board 31 parallel to the scanning lines 32. The connecting line 37 is connected to the bias lines 36. An end of the connecting line 37 is formed as a terminal 37a.

As illustrated in FIG. 3, the scanning driver 4 includes a power supply circuit 41, a gate driver 42 and the like.

The power supply circuit 41 generates two different voltages of an on-voltage and an off-voltage and applies either of them to the gate driver 42.

The gate driver 42 switches the voltages to be applied respectively to the lines L1 to Lx of the scanning lines 32 between the on-voltage and the off-voltage.

The reader 5 includes reading circuits 51, an analog multiplexer 52, an A/D converter 53 and the like.

The reading circuits 51 are connected respectively to the signal lines 33.

Each of the reading circuit 51 includes an integrating circuit 51a, a correlated double sampling circuit (hereinafter referred to as a CDS circuit) 51b and the like.

The integrating circuit 51a integrates a charge released to the signal lines 33 and outputs a voltage value to the CDS circuit 51b according to the integrated amount of charge.

The CDS circuit 51b samples and holds an output voltage of the integrating circuit 51a before the on-voltage is applied (i.e. while the off-voltage is applied) to a scanning line 32 connected to radiation detecting elements 34 from which a signal is to be read, so as to output the difference of an output voltage of the integrating circuit 51*a* after the on-voltage is applied to the scanning line 32 to read a signal charge of the radiation detecting element and then the off-voltage is applied to the scanning line 32.

Alternatively, the CDS circuit 51*b* may samples and holds an output voltage of the integrating circuit 51*a* after a signal charge is read, so as to output the difference.

The analog multiplexer 52 sequentially outputs differential signals from the CDS circuits 51*b* to the A/D converter 53. The analog multiplexer 52 may output two or more input signals to the A/D converter 53 so as to be able to generate one pixel from two or more pixels (e.g. one averaged pixel of four pixels).

The A/D converter 53 sequentially converts input image data in analog voltage values to image data in digital values. Instead of providing the analog multiplexer 52, the CDS circuits may include respective A/D converters.

The hardware processor 6 includes a computer in which a CPU (central processing unit), an ROM (read only memory), a RAM (random access memory), an I/O interface and the like (not shown) are connected to each other via a bus, an FPGA (filed programmable gate array) and the like. Alternatively, the hardware processor 6 may be constituted by a dedicated controlling circuit.

The hardware processor 6 detects the start of a radiation by a predetermined detection method. That is, the hardware processor 6 serves as a detecting means of the present invention. The detection method is not particularly limited. For example, the detection may be based on a signal from a radiation sensor (not shown) or a reader 5 or on a change of the current through the bias power supply 9B.

The storage 7 is constituted by a SRAM (static RAM), an SDRAM (synchronous DRAM), a NAND flash memory, an HDD (hard disk drive) and the like.

The communicator 8 communicates with the outside through an antenna 81 and a connector 82 in a wired or wireless manner.

The internal power supply 9A, which is constituted by a lithium-ion cell, a lithium-ion capacitor or the like, supplies electric power to the radiation detector 3, a scanning driver 4 and the like.

The basic operation of the radiographic imaging apparatus 20 having the above-described configuration is as follows.

When the power switch 11 is turned on, a reverse bias voltage is applied from the bias power supply to the radiation detecting elements 34 through the connecting line 37 and the bias lines 36. Further, a reference voltage is applied to the signal lines through the reading circuits 5.

Then, dark charge resetting is started as illustrated in FIG. 4. Specifically, the scanning driver 4 applies the on-voltage to the TFTs 35 in the uppermost gate line L1 so as to apply the reverse bias voltage, which is the difference between the reference voltage applied to the signal lines and the bias voltage applied to the bias lines, to the radiation detecting elements 34. Then, dark charges accumulated in the gate line L1 are released to the signal lines 33. In this way, the dark charge resetting of the gate line Lx is performed at every N lines starting from the uppermost gate line L1 to the lower lines (from one end to the other end) (every two lines in FIG. 4). When the number of gate lines Lx remaining below becomes less than N, the dark charge resetting is performed at every N lines from the non-reset uppermost gate line Lx. This process is repeated until all gate lines Lx are reset. When dark charge resetting is completed on all gate lines Lx, it is started again from the uppermost gate line L1.

When a radiation is emitted from the radiation emitter 10 at a certain timing in the repeated dark charge resetting (when the dark charge resetting is performed on the third gate line L3 in FIG. 4), the radiographic imaging apparatus 20 detects the radiation by using its AED function. For example, since the detection by the AED function is based on whether the integral of an increase of the current flowing through the signal lines is equal to or greater than a threshold, there is a time lag before the radiation is detected (when the dark charge resetting is performed on the seventh gate line L7 in FIG. 4). In response to detection of the radiation, the resetting process is terminated, and application of the on-voltage to scanning lines is stopped at least in the area to be used for a diagnostic image so that charges are accumulated. That is, the charges generated in the radiation detecting elements 34 by the radiation are accumulated in the corresponding pixels r.

After the radiation ends, image data starts to be read. Specifically, when a radiation is detected, the on-voltage is applied to the TFTs 35 at every N gate lines in the same manner as in the dark charge resetting from the gate line Lx (gate line L7 in FIG. 4) N lines below the gate line (gate line L9 in FIG. 4) on which the dark charge resetting is performed at the time of the detection (the nth gate line Lx in the next nth cycle of N cycles if there is no gate line N lines below the current gate line), so as to release charges accumulated in the gate line Lx to the signal lines 33.

Instead of the gate line which is to be scanned next to the gate line on which the dark charge resetting is performed, image data may be read from another gate line Lx that is not in the scanning pattern of the dark charge resetting, for example, from the first line L1.

Then, the integrating circuits 51*a* of the reading circuits 51 integrate the charges released to the signal lines 33 and output voltage values according to the amount of integrated charges. The CDS circuit 51*b* outputs image data in analog voltages. The image data thus output is sequentially sent to the A/D converter 53 through the analog multiplexer 52. The A/D converter 53 sequentially converts the image data in analog values output from the analog multiplexer 52 to image data in digital values. In this way, image data is read out. That is, the reader 5 reads charges accumulated in pixels r at every predetermined lines as signal values of image data.

After correction such as reduction of the offset component is made according to need, the image data in digital values thus read is stored in the storage 7.

Correction of Signal Value

Figure 5:
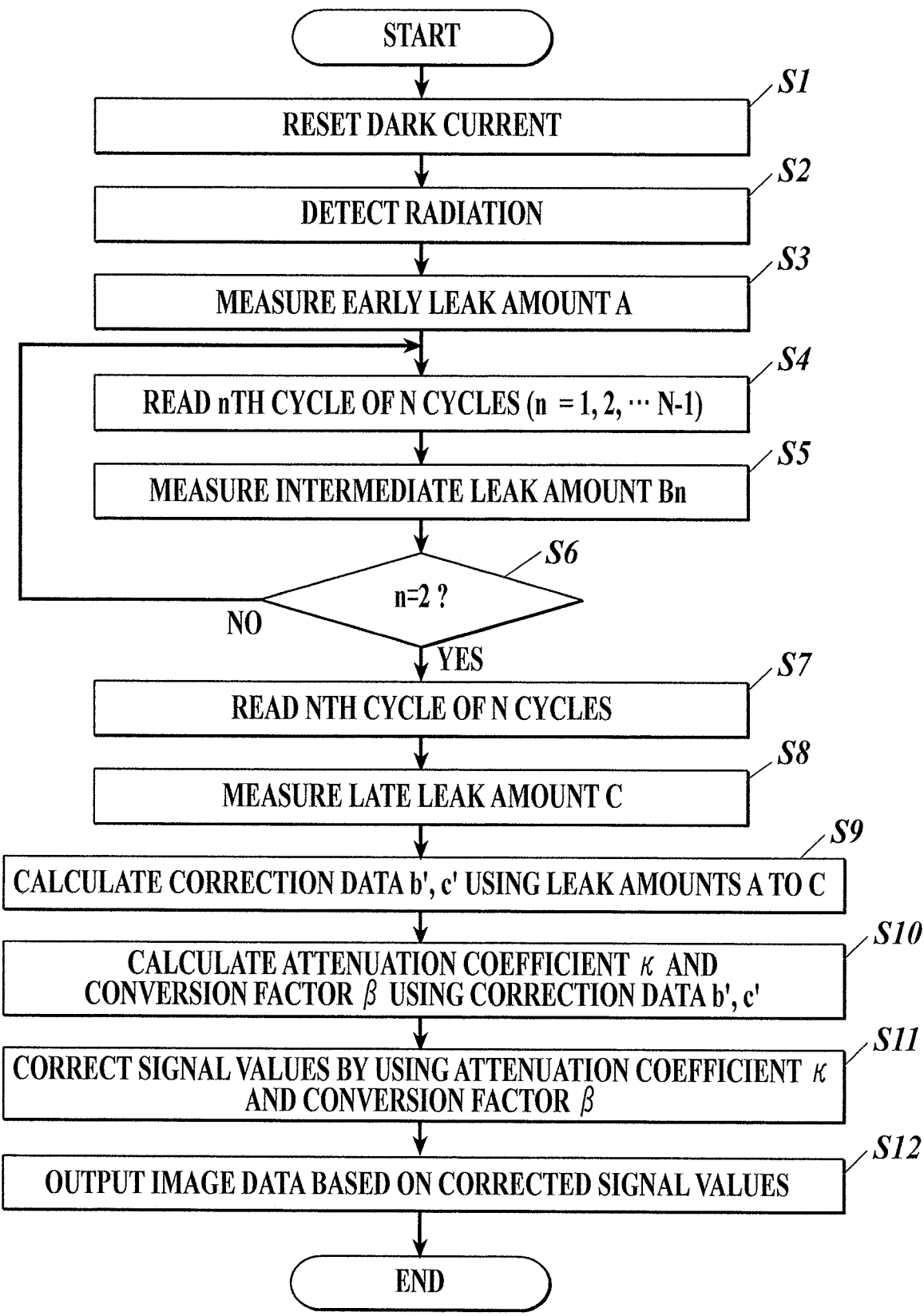
FIG. 5 is a flowchart of the operation of the radiographic imaging apparatus in FIG. 1.

Next, correction of pixel signal values by the radiographic imaging apparatus 20 according to the embodiment will be described. Hereinafter, a leak current refers to a current that is composed of a static leak current component, a PD forward current component and a PD lag component. FIG. 5 is a flowchart illustrating the operation of the radiographic imaging apparatus 20.

The hardware processor 6 of the radiographic imaging apparatus 20 according to the embodiment performs the operation illustrated in FIG. 5 (a part of steps in FIG. 5 corresponds to the above-described basic operation) between the above-described basic operations. Specifically, the operation starts with repeating the dark charge resetting (Step S1), and after detecting a radiation (stopping application of the on-voltage) (Step S2), obtaining correction data (measuring the early leak amount A) in which a leak current value is obtained before signal charges are read from the pixels (Step S3).

Next, Step S4 to Step S6 for measuring an intermediate leak amount $B_n$ will be described.

Signal values are read from pixels in gate lines in approximately one of N cycles (Step S4).

Then, a leak current value and corresponding correction data are obtained to measure the intermediate leak amount $B_n$ ($B_1$) (Step S5).

Then, if n=2 in the end determination in Step S6, i.e. the end determination is true, the process continues with Step S7.

If n>2, signal values are further read from pixels in gate lines in approximately one of N cycles, i.e. approximately two of N cycles in total (Step S4), and a leak current value and corresponding correction data are obtained to measure the intermediate leak amount $B_n$ ($B_2$) (Step S5). These steps are repeated until the end determination becomes true in Step S6.

In Step S7, signals are read from the pixels in the remaining gate lines so that signals are read from the pixels in all gate lines.

In Step S8, a leak current value and corresponding correction data are obtained to measure the late leak amount C.

That is, when N=2, the intermediate leak amount $B_n$ is measured once in a period of reading signal values of the pixels in all gate lines, and only the intermediate leak amount $B_1$ is determined. In contrast, when N≥3, the intermediate leak amount Bn is measured multiple times, and the intermediate leak amounts $B_1$ to $B_{N-1}$ are determined, in which Step S4 and Step S5 are repeated until it is determined in Step S6 that n reaches n=N−1.

As described above, the radiographic imaging apparatus 20 of the embodiment measures the leak current by obtaining correction data at least at three points of time after detecting a radiation.

It is preferred that the leak current is measured multiple times in each obtainment of correction data (each measurement of the early leak amount A, the intermediate leak amount $B_n$ and the late leak amount C), and an average, median or mode value of the obtained measurement values are calculated as the early leak amount A, the intermediate leak amount $B_n$ or the late leak amount C. This can reduce the influence of noises. In this regard, a suitable threshold may be set for the leak current to exclude abnormal values from the calculation, or the leak amounts may be calculated only from data obtained in a certain cycle.

Instead of making the measurement multiple times, the influence of noises may be reduced by changing the drive timing of the reader 5. For example, the period of integrating the leak current may be doubled, and the obtained value may be divided by 2.

The timing of measuring the early leak amount A is not limited to before reading signal charges from pixels. The measurement may be made after several lines are read. Further, the timing of measuring the late leak amount C is not limited to after reading signal values of the pixels in all gate lines. The measurement may be made when the pixels in several lines has not been read yet. For example, when there are 11 gate lines in total and discrete scanning is made at every N=2 lines (every other line), the following reading patterns are possible.

The measurements are made before the reading is started, after the gate line L9 is read (five lines are read), and after the gate line L8 is read (10 lines are read and one unread line is left).

The measurements are made before the reading is started, after the gate line L9 is read, and after the reading is completed (all 11 lines are read).

The measurements are made before the reading is started, after the gate line L9 is read (six lines are read), and after the reading is completed (all 11 lines are read).

The measurements are made after the gate line L1 is read (one line is read), after the gate line L11 is read, and after the reading is completed.

After measuring the leak amounts A to C, the hardware processor 6 calculates correction data b' and c' from the leak amounts A to C using the following equations (1) and (2) (Step S9).

Correction Data $b_n'$=Intermediate Leak Amount
$B_n$−Early Leak Amount A×n/N        (1)

Correction Data $c'$=Late Leak Amount $C$        (2)

When N≥3 and two or more intermediate leak amounts $B_n$ are measured, two or more correction data $b_n'$ are calculated accordingly. With more correction data bn', it is possible to improve the accuracy of the correction.

Assuming the leak current decreases linearly, the intermediate leak amount $B_n$ measured at the end of nth cycle of N cycles is represented by a proportion of the early leak amount A, i.e. early leak amount A×n/N. For example, when N=2, intermediate leak amount $B_1$=early leak amount A/2. That is, the correction data b', which is calculated using the above-described equation (1), corresponds to the non-linear component of a leak current value.

Further, assuming the leak current decreases linearly, the late leak amount C is almost 0 since signals have been already read completely. That is, when the late leak amount C is greater than 0, the measured value can be considered as the non-linear component of the leak current. Accordingly, the correction data c', which is calculated using the above-described equation (2), corresponds to the non-linear component of the leak current in a late stage of reading.

Next, the hardware processor determines a static leak amount conversion factor α by using the following equation (3). This factor represents how many times a leak current flowing to a signal line is as high as a signal value of a pixel.

Static Leak Amount Conversion Factor $\alpha(X)$=Leak
Amount $A(X)/S_{sum}(X)$        (3)

$S_{sum}(X)$: the integrated value of signal values of all pixels in a signal line X $S_{sum}(X)$ may be determined as the integrated value of signal values of pixels in one of N cycles multiplied by N. For example, when N=2, $S_{sum}(X)$ may be calculated as twice the sum of signal values of pixels in L1+signal values of pixels in L3+ . . . . This can reduce the processing time.

The static leak amount conversion factor α may be determined for respective signal lines or as a common factor for all signal lines calculated from the average or median of the signal lines to be corrected.

When $S_{sum}(X)$ is equal to or less than a certain threshold, periodic uneven density is not visible even without any correction since the leak current and the like is small. Such signal lines may be excluded from the correction.

Then, the hardware processor calculates an attenuation coefficient κ from the calculated correction data b' and c' using the following equations (4) and (5) (Step S10). The attenuation coefficient κ is the ratio of attenuation of the non-linear component per each reading of a gate line. The equation (4) is applied when N=2, and the equation (5) is applied when N≥3.

Attenuation Coefficient $\kappa = \{(\text{Correction Data } c' - \text{Correction data } b_1')/\text{Correction Data } b_1'\}^{\wedge}(1/\text{Number of Gate Lines Between Correction Data Obtainment})$        (4)

Attenuation Coefficient $\kappa = \{(\text{Correction Data } b_n' - \text{Correction data } b_{n-1}')/\text{Correction Data } b_{n-1}'\}^{\wedge}(1/\text{Number of Gate Lines Between Correction Data Obtainment})$        (5)

Number of Gate Lines Between Correction Data Obtainment: the number of gate lines scanned (to obtain an image) after obtainment of the intermediate leak amount $B_n$ ($B_{n-1}$) before obtainment of the late leak amount C (intermediate leak amount $B_n$)

The attenuation coefficient κ corresponds to $\exp(-t/\tau)$ (τ: time constant, t: gate scanning time). With this, it is possible to transform the equation that uses the determined time constant τ.

To calculate the attenuation coefficient κ, the following equation (4') may be used when N≥2 and N is an even number.

Attenuation Coefficient κ={(Correction Data $c'$-Correction data $b_{n/2}'$)/Correction Data $b'$}^(1/Number of Gate Lines Between Correction Data Obtainment) (4')

Calculation of the attenuation coefficient κ is not limited to the above equations and may be calculated by any method based on the same principle.

The attenuation coefficient may be determined as coefficients κ(X) for respective signal lines or as a common coefficient κ.

When a common coefficient κ is determined, it is preferred to exclude signal lines that are not to be corrected.

When N≥3, two or more values can be obtained as the attenuation coefficient κ, and it is possible to calculate the average thereof or to weight the values to determine the attenuation coefficient κ. To be specific, κ1 calculated from $b_2'$ and $b_1'$ and κ2 calculated from $c'$ and $b_2'$ may be used to calculate an average κ or a weighted κ such as κ×3/4+κ2× 1/4. The weight of κ1 is greater since the accuracy of κ1 is higher than κ2.

It is preferred to limit the range of the attenuation coefficient κ. For example, the upper and lower limits may be set to 1 and 0.9 respectively. Since the attenuation coefficient κ changes depending on the temperature, it is possible to determine the range from evaluation in the range of a lowest operation temperature to a highest operation temperature.

Then, in Step 10, the hardware processor 6 calculates a time-dependent conversion factor β from the attenuation coefficient κ determined in Step S9 using the following equation (6). The conversion factor β is used for conversion to a component called a PD forward component or PD lag component.

The PD lag component will be described. When a signal charge is read from a PD as a radiation detecting element of each pixel, a current IL (t) occurs according to the signal charge. This current has a characteristic of attenuating over time. Of this current, a current $IL(t) C_{sd}/(C_{pd}+C_{sd})$ flows to a signal line, which corresponds to the approximate capacity ratio of the capacity $C_{pd}$ of the PD and the source-drain capacity $C_{sd}$ of a TFT. This is referred to as a PD lag component.

Back to description of the conversion factor β, the conversion factor β may be calculated by any method. For example, a suitable initial value $β_0$($β_0≠(0)$) may be set for the calculation. In this case, a tentative late leak amount $C_0$ is calculated using an equation (9) (described later), and the conversion factor β is determined so that it is equal to late leak amount C. Alternatively, a tentative intermediate leak amount $B_{n0}$ and a tentative late leak amount $C_0$ may be calculated, and the conversion factor β is determined so that the errors from the intermediate leak amount $B_n$ and the late leak amount C become minimum.

$$H(X,Y)=β \times S_{org}(X,Y)+κ \times H(X,Y-N) \quad (6)$$

For example, when N=2, the equation is initialized as $H(X, -1)=0$. Then, the calculation using the equation (6) is represented as the following equations (6') and (6'').

$$H(X,1)=β_0 \times S_{org}(X,Y)+κ \times H(X,-1) \quad (6')$$

$$H(X,3)=β_0 \times S_{org}(X,3)+κ \times H(X,1) \quad (6'')$$

Then, in the first cycle of N cycles, β can be determined as the product of the correction data $b_1'/H(X, M/2)$, which is the ratio of H (X, M/2) (or H(X, M/N)) and the correction data $b_1'$, and $β_0$, where M is the total number of scans for reading signals from pixels.

Instead, in the Nth cycle of N cycles, β can be determined as the product of the correction data $c'/H(X, M)$, which is the ratio of H (X, M) and the correction data $c'$, and $β_0$.

β may be determined by linear approximation to the values at the above-described points based on the least square method.

The conversion factor β may be determined as coefficients β(X) for respective signal lines or as a common coefficient β.

When a common coefficient β is determined, it is preferred to exclude signals that are not to be corrected.

Then, the hardware processor corrects the leak current component by using the following equation (7) (Step S11). That is, the hardware processor calculates corrected pixel signal values $S_{cor}(X, Y)$ of respective pixels.

$$S_{cor}(X,Y)=S_{org}(X,Y)-\{S_{leak1}(X,Y)+S_{leak2}(X,Y)\} \quad (7)$$

$S_{org}(X, Y)$: pixel signal values that are actually read
$S_{leak1}(X, Y)$: the amount of correction for the static leak component
$S_{leak2}(X, Y)$: the amount of correction for leak components other than the static leak component $S_{leak1}(X, Y)$ and $S_{leak2}(X, Y)$ in the above equation (7) are calculated from the calculated static leak amount conversion factor α, the attenuation coefficient κ, the conversion coefficient β using the following equations (8) and (9).

$$S_{leak1}(X,Y)=α(X) \times (S_{sum}(X)-S_{read\_sum}(X)) \quad (8)$$

$$S_{leak2}(X,Y)=κ(X) \times \{β(X) \times S_{org}(X,Y-N)+S_{leak2}(X,Y-N)\} \quad (9)$$

$S_{read\_sum}(X)$: integrated value of signal values of pixels in a signal line X that have been already read (i.e. in processed gate lines)
$S_{sum}(X)$: integrated value of signal values of all pixels in the signal line X The corrected $S_{cor}(X, Y)$ thus obtained is values that are calculated based on the three or more leak amounts A, $B_n$ and C that are determined at different points of time. That is, the hardware processor 6 serves as a correcting means of the present invention.

Thereafter, the hardware processor 6 generates image data from the calculated pixel signal values in which image deterioration is corrected (Step S12).

The above-described correction may be made in a console 30 instead of the hardware processor 6 of the radiographic imaging apparatus 20.

Variations

While the present invention is specifically described with an embodiment, the present invention is not limited to the above-described embodiment, and changes can be made without departing from the features thereof.

For example, whether a correction is necessary may be determined prior to the above-described processing although it is not described in the above embodiment. Specifically, the leak amounts A to C or the correction data b' and c' are compared with a predetermined threshold in the storage. If the leak amounts A to C or the correction data b' and c' are less than (or not greater than) the threshold, the correction of signal values is not carried out. In this configuration, the hardware processor 6 serves as a comparing means of the present invention and can omit the image correction. When the leak current is low, an image can be displayed faster.

It is preferred that there is a waiting time after completion of a radiation before start of the reading. Specifically, the detecting means may include a time counting means such as a timer for counting the time elapsed after the detecting means detects completion of the radiation, and the early leak amount A starts to be obtained a predetermined time after the start of counting time. It is preferred that the specific waiting time is 0.1 second or more.

Such a waiting time is set because a forward potential is generated in a PD as a radiation detecting element when the radiation detecting element that receives a large dose of radiation generates such a large amount of charge that cannot be accumulated in the radiation detecting element. During the radiation, the forward potential increases until a forward current caused by the PD forward potential is balanced out by a current as the generation rate of charge, and the forward potential then remains at the same level. When the radiation is completed, the PD forward potential causes a flow of a forward current since the charge is not generated any more. Of this forward current IF, a current $IF \times C_{sd}(C_{pd}+C_{sd})$ flows to a signal line, which corresponds to the approximate capacity ratio of the capacity $C_{pd}$ of the PD unit and the source-drain capacity $C_{sd}$ of a TFT. To be exact, the current that flows depends on other parasitic capacities. For determining a suitable waiting time, an attenuation function may be determined from the capacity $C_{pd}$ of a PD unit using the equation of a forward current of a diode. The signal line current caused by this forward current has a characteristic that is greatly deviated from an exponential right after a radiation. However, during a waiting time, not only the forward current falls, but also the deviation from the exponential decreases. This allows the more accurate correction.

Our study revealed that there is another cause of periodic uneven density in addition to the leak current flowing through signal lines, and a correction for such uneven density may also be made along with the above-described correction. Specifically, a parasitic capacity between a radiation detecting element and other radiation detecting elements in adjacent scanning lines causes relations of $A=B \times a$ and $C=B/a$, where A is the signal value when a charge is read from no pixel in the upper and lower adjacent scanning lines, B is the signal value when a charge is read from a pixel only in one of the upper and lower adjacent scanning lines, and C is the signal value when changes are read from pixels in both upper and lower adjacent scanning lines. Accordingly, it is possible to make a correction by using the constant correction factor $\alpha$.

Configuration of Radiographic Imaging System

Figure 6:
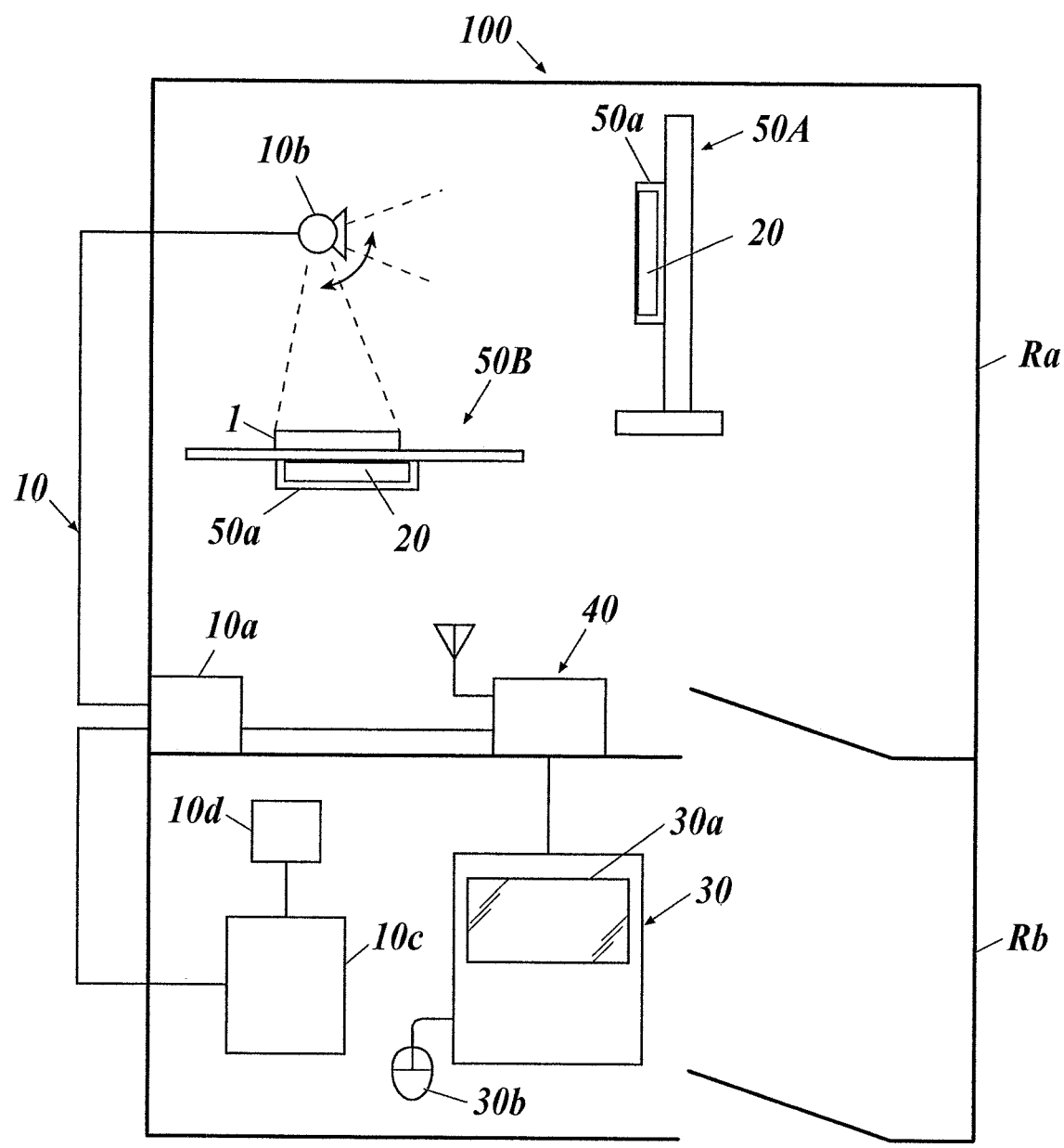
FIG. 6 is a schematic view of a radiographic imaging system including the radiographic imaging apparatus in FIG. 1.

Next, the configuration of a radiographic imaging system 100 using the above-described radiographic imaging apparatus 20 will be described. FIG. 6 is a schematic view of the radiographic imaging system 100.

As illustrated in FIG. 6, the radiographic imaging system 100 of the embodiment includes a radiation emitter 10, the radiographic imaging apparatus 20, a console 30, a relay 40 and the like.

The radiographic imaging system 100 is connected to a radiology information system (RIS), a picture archiving and communication system (PACS) and the like (not shown) according to need.

The radiation emitter 10 includes a radiation source 10a, a generator 10b, an operation table 10c and the like.

The radiation source 10a includes a rotating anode capable of generating radiation, a filament for emitting an electron beam to the rotating anode and the like (not shown).

The generator 10b controls the radiation source 10a to emit a radiation at a dose according to a preset tube voltage, a tube current, a radiation time (mAs value) and the like.

The operation table 10c includes an exposure switch 10d that is operable by a user such as a radiology technician. In response to an operation on the exposure switch 10d, the operation table 10c sends a command to start a radiation to the generator 10b.

The radiographic imaging apparatus 20 is of a non-coordinated type that detects a radiation by itself. When the radiographic imaging apparatus 20 receives a radiation from the radiation emitter 10, it reads image data and sends it to the outside (console 30 or the like).

The console 30 is constituted by a computer, a dedicated apparatus and the like, which include a hardware processor, a storage and the like (not shown) as well as a display 30a, an operation interface 30b and the like.

The display 30a is constituted by a CRT (cathode ray tube), an LCD (liquid crystal display) and the like.

The operation interface 30b is constituted by a mouse, a keyboard, a touch panel and the like.

The relay 40 has a function of an access point or a hub that relays wireless or wired communication between the radiographic imaging apparatus 20 and the console 30.

However, the radiographic imaging apparatus 20 and the console 30 may communicate with each other without the relay 40.

In the radiographic imaging system 100 having the above-described configuration, the radiation emitter 10 emits a radiation to a patient in the conditions set on the operation table 10c in response to a user operation on the exposure switch 10d. Then, the radiographic imaging apparatus 20 disposed behind the patient receives the radiation that has penetrated the patient, reads image data of the radiation and sends the read image data to the console 30 through the relay 40.

The radiographic imaging system 100 of the embodiment may include a fixedly installed radiation emitter 10 as illustrated in FIG. 6 or be combined with a visiting car (not shown).

When the radiographic imaging system 100 is installed in a building, for example, the radiation source 10a and the generator 10b of the radiation emitter 10, the radiographic imaging apparatus 20, the relay 40 and the like are installed in a radiography room Ra while the operation table 10c of the radiation emitter 10, the console 30 and the like are installed in a front room Rb (also referred to as an operation room or the like) as illustrated in FIG. 6. In this regard, the system may be configured such that the radiographic imaging apparatus 20 is loaded in a cassette holder 50a of a radiography table (a radiography table 50A for upright radiography, a radiography table 50B for supine radiography). The relay 40 installed in the radiography room Ra can ensure wireless communicating function even when the console 30 is installed in the front room Rb. It also facilitates establishing wired connection by a cable.

When the radiographic imaging system 100 is combined with a visiting car, the components other than the radiographic imaging apparatus 20 are installed in the visiting car while the radiographic imaging apparatus 20 is configured to be portable. To take a radiograph by using the visiting car, for example, the radiographic imaging apparatus 20 is intervened between a bed and a patient laying on the bed or is placed on a patient. The radiographic imaging apparatus 20 and the console 30 may directly communicate with each other so that the relay 40 is not necessary, or they may communicate with each other through the relay 40 (not shown).

Although embodiments of the present invention have been described and illustrated in detail, the disclosed embodiments are made for purposes of illustration and example only and not limitation. The scope of the present invention should be interpreted by terms of the appended claims.

The entire disclosure of Japanese patent application No. 2017-100514, filed on May 22, 2017, is incorporated herein by reference in its entirety.

What is claimed is:

1. A radiographic imaging apparatus, comprising:
   a base board on which pixels comprising respective radiation detecting elements and respective switching elements are arranged in a matrix, wherein the radiation detecting elements are configured to accumulate charges when receiving a radiation;
   a plurality of scanning lines configured to drive the switching elements by on-off control;
   a signal line which is arranged to be connected to the switching elements;
   a reader which is configured to read the charges accumulated in the pixels at every predetermined number of scanning lines as signal values of image data; and
   a hardware processor which is configured to measure a leak current flowing through the signal line, to obtain at least three leak current values by measuring the leak current at least three times, and to correct the signal values based on the at least three leak current values,
   wherein the hardware processor is configured to obtain a leak current value from among the at least three leak current values by measuring the leak current during a first period of time when both (i) the number of scanning lines which have been already read is equal to or greater than a predetermined read number of scanning lines and (ii) the number of scanning lines which have not been read yet is equal to or greater than a predetermined remaining number of scanning lines.

2. The radiographic imaging apparatus according to claim 1, wherein the hardware processor is configured to obtain another leak current value among the at least three leak current values by measuring the leak current during a second period of time after a radiation is detected and when the number of scanning lines which have been already read is less than the predetermined read number of scanning lines, wherein the second period of time is before the first period of time.

3. The radiographic imaging apparatus according to claim 1, wherein the hardware processor is configured to obtain another leak current value at among the at least three leak current values by measuring the leak current during a third period of time when the number of scanning lines which have not been read yet is less than the predetermined remaining number of scanning lines, wherein the third period of time is after the first period of time.

4. The radiographic imaging apparatus according to claim 1, wherein the hardware processor is configured to compare the obtained at least three leak current values with a predetermined threshold, and
   wherein if the at least three leak current values are less than the threshold, the hardware processor is configured to not correct the signal values.

5. The radiographic imaging apparatus according to claim 1, wherein the hardware processor is configured to detect a presence or absence of the radiation, to start counting an elapsed time after the radiation becomes undetectable, and to start to obtain the at least three leak current values a predetermined amount of elapsed time after a start of counting the elapsed time.

6. A radiographic imaging system, comprising:
   the radiographic imaging apparatus according to claim 1; and
   a radiation emitter which is configured to emit the radiation to the radiographic imaging apparatus.

* * * * *